(12) United States Patent
Houghtaling

(10) Patent No.: US 8,504,428 B1
(45) Date of Patent: Aug. 6, 2013

(54) SYSTEM AND METHOD OF TRACKING AND ENCODING ELECTRONIC TRANSACTIONS

(76) Inventor: Paul Ward Houghtaling, Alexandria, VA (US)

( * ) Notice: Subject to any disclaimer, the term of this patent is extended or adjusted under 35 U.S.C. 154(b) by 705 days.

(21) Appl. No.: 12/035,070

(22) Filed: Feb. 21, 2008

(51) Int. Cl.
*G06Q 20/00* (2006.01)

(52) U.S. Cl.
USPC .................................. 705/17; 705/16; 705/18

(58) Field of Classification Search
None
See application file for complete search history.

(56) References Cited

U.S. PATENT DOCUMENTS

| | | | |
|---|---|---|---|
| 6,519,573 | B1 | 2/2003 | Shade et al. |
| 6,543,683 | B2 * | 4/2003 | Hoffman ........................ 235/375 |
| 6,898,575 | B2 | 5/2005 | Mull |
| 6,938,013 | B1 | 8/2005 | Gutierrez-Sheris |
| 7,413,117 | B2 * | 8/2008 | Caven et al. .................. 235/379 |
| 7,427,024 | B1 * | 9/2008 | Gazdzinski et al. ........... 235/384 |
| 7,475,807 | B2 * | 1/2009 | Halpin et al. .................. 235/378 |
| 2002/0073026 | A1 | 6/2002 | Gruber et al. |
| 2002/0091538 | A1 | 7/2002 | Schwartz et al. |
| 2002/0138827 | A1 | 9/2002 | Yoshimine et al. |
| 2003/0023494 | A1 * | 1/2003 | Sellman et al. ................... 705/17 |
| 2004/0024698 | A1 | 2/2004 | Hines et al. |
| 2004/0133489 | A1 | 7/2004 | Stremler et al. |
| 2004/0267650 | A1 | 12/2004 | Burnett |
| 2005/0004867 | A1 | 1/2005 | Spector |
| 2006/0149650 | A1 | 7/2006 | Dilley |
| 2006/0178938 | A1 | 8/2006 | Wallace |
| 2006/0212390 | A1 | 9/2006 | Gruber |
| 2007/0088657 | A1 | 4/2007 | Greene |
| 2009/0240626 | A1 * | 9/2009 | Hasson et al. .................. 705/75 |

OTHER PUBLICATIONS

Signapay, Ltd., PC Payment Software, 2006, 1 page, http://signapay.net/pos_pcsoftware.html.
Signapay, Ltd., Internet Gateways, 2006, 1 page, http://signapay.net/pos_gateways.html.
Signapay, Ltd., Credit and Debit Card Transactions, 2006, 2 pages, http://signapay.net/services_creditdebt.html.
Chase Paymentech Solutions, LLC, Full-Service eCommerce Solutions Made Easy, 2006, 2 pages.
Authorize.net Holdings, Inc., Advanced Integration Method (AIM) Implementation Guide Card-Not-Present Transactions, 2007, 57 pages.
National Federation of Independent Business, How a Basic Credit Card Transaction Works: Business Toolbox, 2007, 2 pages, http://www.nfib.com/object/2730732.html.
Cybersource Corporation, Accept Online Payments, 2007, 2 pages.

* cited by examiner

*Primary Examiner* — F. Zeender
*Assistant Examiner* — Christopher Buchanan
(74) *Attorney, Agent, or Firm* — Drinker Biddle & Reath LLP

(57) ABSTRACT

A system of tracking, identifying, and encoding an electronic transaction. The system includes a portal soliciting electronic transactions, an encoder in communication with the portal, a processor in communication with the encoder and a processing network, and a report module in communication with the processor. The encoder accepts electronic transaction data from the portal, forms a code based on the electronic transaction data, and appends the code to the electronic transaction data to provide encoded electronic transaction data. The processing network authorizes the encoded electronic transaction data to provide authorized encoded electronic transaction data, and the processor receives the authorized encoded electronic transaction data. The report module forms a report based on authorized encoded electronic transaction data.

22 Claims, 5 Drawing Sheets

| MERCHANT NAME | TR DATE/TIME | REPORTING MERCH # | ORDER # | BATCH # | BATCH CLOSE | SEQ # | CARD TYPE | AUTH CODE | TERM/OP ID | TR TYPE | AMT | CURR |
|---|---|---|---|---|---|---|---|---|---|---|---|---|
| BENEFICIARY | 11/19/2007 22:23 | 12345678901 | 71119300 | 007-1 | 11/20/2007 0:23 | 1 | Amex | 98710 | 1 | Sale | 15 | USD |
| BENEFICIARY | 11/19/2007 22:23 | 12345678901 | 71119300 | 007-1 | 11/20/2007 0:23 | 2 | Amex | 00034D | 1 | Sale | 75 | USD |
| BENEFICIARY | 11/19/2007 22:23 | 12345678901 | 71119300 | 007-1 | 11/20/2007 0:23 | 3 | Amex | 09456A | 1 | Sale | 10 | USD |
| BENEFICIARY | 11/19/2007 22:23 | 12345678901 | 71119400 | 007-1 | 11/20/2007 0:23 | 4 | Visa | 21903A | 1 | Sale | 50 | USD |
| BENEFICIARY | 11/19/2007 22:23 | 12345678901 | 71119500 | 007-1 | 11/20/2007 0:23 | 5 | MasterCard | 70313 | 1 | Sale | 50 | USD |
| BENEFICIARY | 11/19/2007 22:23 | 12345678901 | 71119400 | 007-1 | 11/20/2007 0:23 | 6 | Visa | 28121B | 1 | Sale | 50 | USD |
| BENEFICIARY | 11/19/2007 22:23 | 12345678901 | 71119600 | 007-1 | 11/20/2007 0:23 | 7 | Discover | 9106 | 1 | Sale | 100 | USD |
| BENEFICIARY | 11/20/2007 22:23 | 12345678901 | 71120300 | 008-1 | 11/21/2007 0:23 | 5 | Amex | 09631B | 1 | Sale | 100 | USD |
| BENEFICIARY | 11/20/2007 22:23 | 12345678901 | 71120300 | 008-1 | 11/21/2007 0:23 | 3 | Amex | 00275B | 1 | Sale | 100 | USD |
| BENEFICIARY | 11/20/2007 22:23 | 12345678901 | 71120400 | 008-1 | 11/21/2007 0:23 | 4 | Amex | 120238 | 1 | Sale | 75 | USD |
| BENEFICIARY | 11/20/2007 22:23 | 12345678901 | 71120400 | 008-1 | 11/22/2007 0:23 | 1 | Visa | 133720 | 1 | Sale | 75 | USD |
| BENEFICIARY | 11/21/2007 22:23 | 12345678901 | 71120400 | 008-1 | 11/22/2007 0:23 | 2 | Visa | 06429B | 1 | Sale | 100 | USD |
| BENEFICIARY | 11/22/2007 22:23 | 12345678901 | 71121500 | 009-1 | 11/23/2007 0:23 | 1 | MasterCard | 04624B | 1 | Sale | 300 | USD |
| BENEFICIARY | 11/22/2007 22:23 | 12345678901 | 71122300 | 010-1 | 11/23/2007 0:23 | 3 | Amex | 06496C | 1 | Sale | 50 | USD |
| BENEFICIARY | 11/22/2007 22:23 | 12345678901 | 71122300 | 010-1 | 11/23/2007 0:23 | 2 | Amex | 04687B | 1 | Sale | 60 | USD |
| BENEFICIARY | 11/22/2007 22:23 | 12345678901 | 71122600 | 010-1 | 11/23/2007 0:23 | 1 | Discover | 13787 | 1 | Sale | 500 | USD |
| BENEFICIARY | 11/22/2007 22:23 | 12345678901 | 71122600 | 010-1 | 11/23/2007 0:23 | 5 | Discover | 17191 | 1 | Sale | 200 | USD |
| BENEFICIARY | 11/22/2007 22:23 | 12345678901 | 71122600 | 010-1 | 11/23/2007 0:23 | 4 | Discover | 12345 | 1 | Sale | 30 | USD |

FIG. 3

CREDIT CARD BATCH SUMMARY REPORT — 400

Beneficiary

November 2007 Transactions

| Batch Number | Card Type | Close Date | Sale Count | Sale Amount | Return Count | Recurring Amount | Return Count | Return Amount | Trans Count | Net Batch Amount |
|---|---|---|---|---|---|---|---|---|---|---|
| 711193 | AmEx | 11/20/2007 | 3 | $ 100.00 | 0 | $0.00 | 0 | $0.00 | 3 | $ 100.00 |
| 711194/5 | Visa/MC | 11/20/2007 | 3 | $ 150.00 | 0 | $0.00 | 0 | $0.00 | 3 | $ 150.00 |
| 711196 | Discover | 11/20/2007 | 1 | $ 100.00 | 0 | $0.00 | 0 | $0.00 | 1 | $ 100.00 |
| 711203 | AmEx | 11/21/2007 | 3 | $275.00 | 0 | $0.00 | 0 | $0.00 | 3 | $275.00 |
| 711204/5 | Visa/MC | 11/21/2007 | 2 | $ 175.00 | 0 | $0.00 | 0 | $0.00 | 2 | $ 175.00 |
| 711214/5 | Visa/MC | 11/22/2007 | 1 | $ 300.00 | 0 | $0.00 | 0 | $0.00 | 1 | $ 300.00 |
| 711223 | AmEx | 11/23/2007 | 2 | $ 110.00 | 0 | $0.00 | 0 | $0.00 | 2 | $ 110.00 |
| 711226 | Discover | 11/23/2007 | 3 | $ 730.00 | 0 | $0.00 | 0 | $0.00 | 3 | $ 730.00 |

FIG. 4

| Date | Type | Description | Withdrawals | Deposits | Balance |
|---|---|---|---|---|---|
| 11/22/2007 | Deposit | AUTOMATED CREDIT MERCH SVCS BKCRD DEP | | $150.00 | $12,000.00 |
| 11/22/2007 | Deposit | AUTOMATED CREDIT MERCH SVCS BKCRD DEP | | $175.00 | $12,150.00 |
| 11/23/2007 | Check | CHECK 719 | $2,391.13 | | $12,325.00 |
| 11/23/2007 | Deposit | AUTOMATED CREDIT MERCH SVCS BKCRD DEP | | $300.00 | $9,933.87 |
| 11/24/2007 | Deposit | AUTOMATED CREDIT DISCOVER NETWORK SETTLEMENT | | $98.50 | $10,233.87 |
| 11/25/2007 | Deposit | AUTOMATED CREDIT AMERICAN EXPRESS SETTLEMENT | | $100.00 | $10,333.87 |
| 11/26/2007 | Deposit | DEPOSIT | | $100.00 | $10,433.87 |
| 11/27/2007 | Deposit | AUTOMATED CREDIT AMERICAN EXPRESS SETTLEMENT | | $275.00 | $10,533.87 |
| 11/28/2007 | Purchase | PURCHASE USPS 1234567890 11/22 | $5.00 | | $10,808.87 |
| 11/28/2007 | Deposit | AUTOMATED CREDIT DISCOVER NETWORK SETTLEMENT | | $719.05 | $10,803.87 |
| 11/29/2007 | Deposit | AUTOMATED CREDIT AMERICAN EXPRESS SETTLEMENT | | $110.00 | $11,522.87 |

SYSTEM AND METHOD OF TRACKING AND ENCODING ELECTRONIC TRANSACTIONS

FIELD OF THE INVENTION

The present invention is related to encoding electronic transactions. In particular, the present invention is related to a system and a method for encoding an electronic transaction to correlate the submitted amount with the deposited amount.

BACKGROUND OF THE INVENTION

As use of the Internet expands, ever more financial transactions are completed electronically between two remote parties. One growing area of electronic financial transactions is donations, and in particular political donations. As seen in recent political campaigns, significant contributions are made to a particular candidate through the Internet. Donations can also be made to organizations for charitable, humanitarian, religious, or other reasons.

Primarily, donations made through the Internet are through credit cards. If a donor wishes to donate electronically to a particular beneficiary, the donor presents credit card information through the beneficiary's website. The credit card can be one of several kinds, such as credit cards by VISA®, MASTERCARD®, AMERICAN EXPRESS®, DISCOVER®, as well as other lesser cards, or debit cards. Generally, credit card transactions made in person at a retail store require that the credit card be swiped by a credit card reader so that the account number, cardholder name, expiration date, and/or other information can be read from a magnetic strip on the credit card, as discussed in "Accept Online Payments" by the CyberSource Corporation in 2007. Swiping the credit card through a reader quickens the transaction because the information does not have to be manually entered. However, when a donor is donating through the Internet, the donor has to manually enter the credit card information into the organization's web page to complete the transaction. Thus, Internet websites often use a gateway that takes the place of a credit card reader, as described by CyberSource. The gateway requests the appropriate information required to begin the transaction, such as cardholder name, credit card account number, and expiration date. The gateway responds to the credit card holder by indicating whether or not the credit card transaction has been authorized and approved.

After the donor has entered his credit card information along with, at least, the transaction amount, the gateway sends the credit card transaction data to a processing network, as discussed by CyberSource. The processing network translates the electronically submitted credit card transaction data into a form that can be read by the bank that issued the credit card or provided the credit account. Then, the processing network delivers the electronically submitted credit card transaction data to the issuing bank for authorization. The issuing bank authorizes the credit card transaction if the credit card information is valid and if there is sufficient credit or balance available to cover the transaction amount. Once authorized by the issuing bank, the issuing bank causes the processing network to send an approval code back to the gateway. The gateway then sends an indication that the credit card transaction has been approved to the website, and the website indicates that the transaction has been authorized.

As further described by CyberSource, authorized credit card transactions are typically stored in groups of transactions called "batches" in the gateway. The gateway typically closes out the batches of stored authorized credit card transactions on a daily basis. Generally, at the end of each day, the gateway automatically transmits all authorized credit card transaction data through the processing network so that funds can be transferred from the bank that issued the credit card to the beneficiary's bank account. The issuing bank then transfers funds to the beneficiary's bank account through the processing network to settle the authorized credit card transactions.

The movement of funds from the issuing bank to the beneficiary's account may take several days. Thus, the beneficiary's bank account may not be credited with the transaction amount for several days after the transaction was approved. For instance, VISA® and MASTERCARD® transactions typically take about 1-2 days for funds to be credited to the beneficiary's bank account, while AMERICAN EXPRESS® transactions take about 5-7 days, and DISCOVER® transactions take 3-5 days. Both VISA® and MASTERCARD® use a bank card system in communication with a banking network, whereas AMERICAN EXPRESS® and DISCOVER® use an outside credit card system that is not in direct communication with the banking network. Thus, AMERICAN EXPRESS® and DISCOVER® transactions take longer because they are outside of the banking network used by VISA® and MASTERCARD®.

Also, during the processing of each credit card transaction, transactions fees are collected. Credit card transactions that occur through the Internet can have the credit card transaction fees taken out before or after the transaction amount is credited to the beneficiary's account. Under a net billing agreement, credit card transaction fees are taken out before the amount is credited to the beneficiary's account, while under a gross billing agreement, no transaction fees are taken out before crediting the beneficiary's account. Rather, the transaction fees are collected later from the beneficiary or the beneficiary's account. Typically, net billing agreements are used.

Consequently, several problems arise when trying to correlate the amount submitted by the donor and the actual amount credited to the beneficiary's account. First, the correlation is complicated by the transaction fees. The submitted amount (i.e., the amount paid by the donor before transaction fees are taken out) may not be equal to the credited amount (i.e., the amount ultimately received by the beneficiary after fees are taken out) because transaction fees may have been deducted before the submitted amount was credited to the beneficiary's account under a net billing type agreement. Second, the various delays between when the transaction occurs and when funds are transferred into the beneficiary's account further complicate correlating the submitted amount with the credited amount. As a result of the different time periods for moving funds from different issuing banks to the beneficiary's account, the credited amount will not be received in the same chronological order as the donations.

The problems described above are especially acute for political fundraising where applicable laws require precise reporting and accounting of submitted donations with deposits credited to the political organization's bank account. To address these problems, political candidates have retained teams of accountants who manually track, correlate, and report donations to meet the legal requirements. However, the manual tracking is very labor intensive, inefficient, and slow. The proper accounting of donations can become even more difficult if there are large numbers of donations, transaction fees are deducted before funds are deposited, the deposits are made at varying times after the donation, and the correlations are not made until account statements are received.

SUMMARY OF THE INVENTION

Accordingly, one aspect of the present invention is to track, identify, and correlate payment transactions, and especially those having transaction fees assessed. Another object of the present invention is to provide a system and a method to do the same. Yet another object of the present invention is to expedite and simplify the tracking and correlating of transactions. Also, another object of the present invention is to report payment transactions. Furthermore, another object of the present invention is to correlate a submitted amount paid with the credited amount. And, another object of the present invention is to facilitate compliance with political campaign and charity laws.

One embodiment of the present invention provides a system of tracking, identifying, and encoding an electronic transaction. The system includes a portal soliciting electronic transactions, an encoder in communication with the portal, a processor in communication with the encoder and a processing network, and a report module in communication with the processor. The encoder accepts electronic transaction data from the portal, forms a code based on the electronic transaction data, and appends the code to the electronic transaction data to provide encoded electronic transaction data. The processing network authorizes the encoded electronic transaction data to provide authorized encoded electronic transaction data, and the processor receives the authorized encoded electronic transaction data. The report module forms a report based on authorized encoded electronic transaction data.

Another embodiment of the present invention provides a method of tracking, identifying, and encoding an electronic transaction. The method includes the steps of: providing electronic transaction data, forming a code based on the electronic transaction data, appending the code to the electronic transaction data to encode the electronic transaction data, submitting the encoded electronic transaction data for processing, storing data based on authorized encoded electronic transactions, retrieving the stored data, interpreting the stored data, and forming a report based on the stored data.

Yet another embodiment of the present invention provides an apparatus for tracking, identifying, and encoding an electronic transaction. The apparatus includes means for obtaining electronic transaction data, means for forming a code based on the electronic transaction data, means for appending the code to the electronic transaction data, means for submitting the encoded electronic transaction data for processing, means for storing data based on authorized encoded electronic transactions, means for interpreting the stored data, and means for forming a report based on the stored data.

Yet another embodiment of the present invention provides a system of tracking, identifying, and encoding an electronic credit card transaction. The system includes a processor receiving authorized electronic transaction data having a code that identifies the credit card type and a report module in communication with the processor. The report module forms a report that includes the total authorized electronic transactions on a particular day for each credit card type.

Other objects, advantages and salient features of the invention will become apparent from the following detailed description, which, when taken in conjunction with the annexed drawings, discloses a preferred embodiment of the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a portion of exemplary data provided by a processor of the system illustrated in FIG. 1;

FIG. 4 is a portion of an exemplary report provided by the system illustrated in FIG. 1;

FIG. 5 is a portion of an exemplary bank statement with transactions listed on the exemplary report illustrated in FIG. 4.

DETAILED DESCRIPTION OF THE INVENTION

Figure 1:
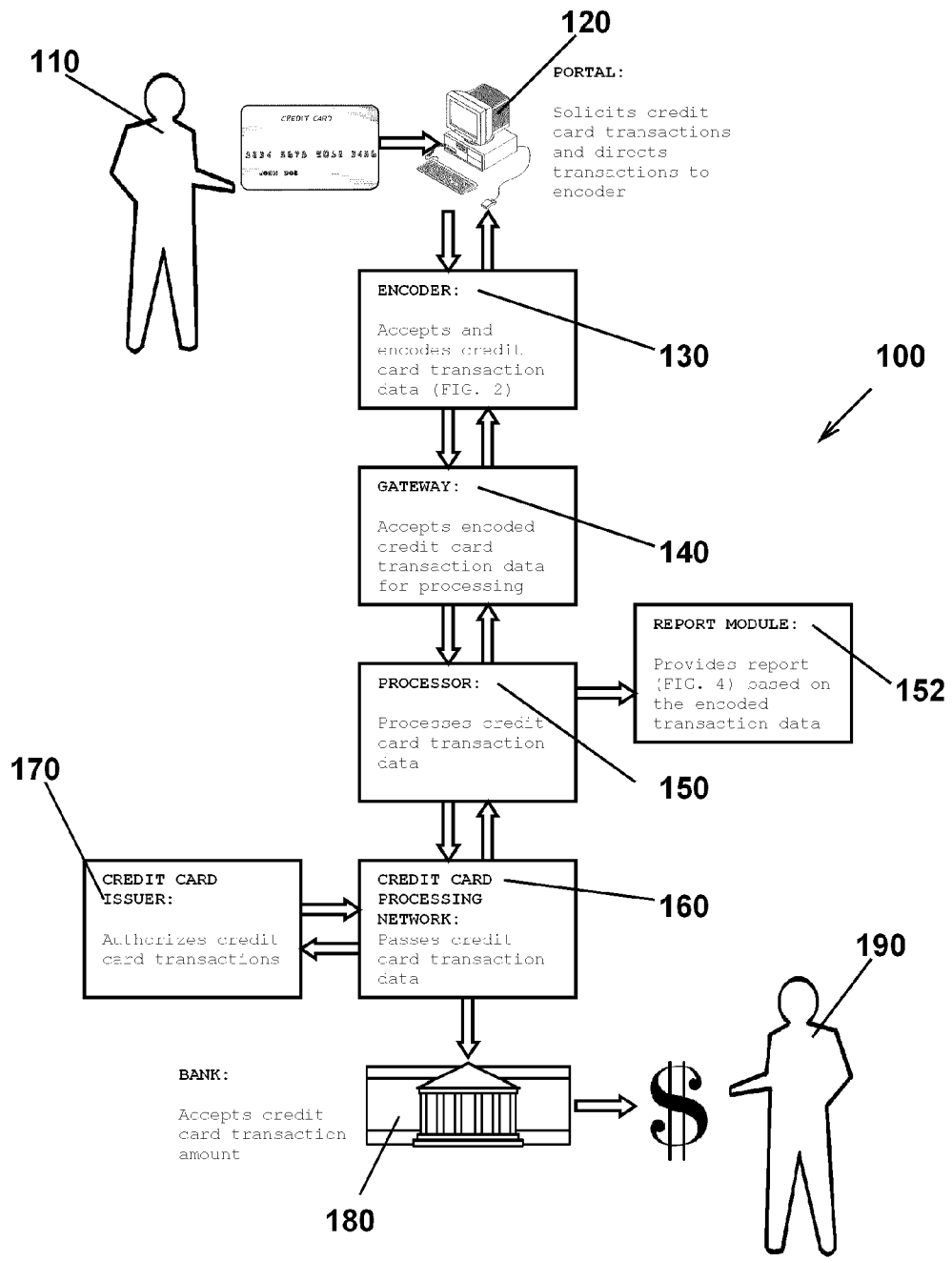
FIG. 1 is a block diagram of a system of tracking, identifying, and encoding electronic transactions in accordance with an exemplary embodiment of the invention.

Referring to FIGS. 1-6, the present invention provides a system 100 (FIG. 1) and a method 600 (FIG. 6) of tracking, identifying, and encoding electronic transactions. Referring to FIG. 1, the system 100 includes a portal 120, an encoder 130, a gateway 140, a processor 150, and a report module 152. To facilitate the description of the invention without intending to limit the invention, the system 100 will be described as it tracks, identifies, and encodes an Internet credit card transaction where an individual 110 donates a particular amount to a beneficiary 190. Accordingly, the system 100 is in communication with a credit card processing network 160, and the network 160 is in communication with a credit card issuer 170 and a bank 180. In alternate embodiments, the system 100 can be used with electronic check transactions and other transactions where electronic transaction data is submitted.

In the embodiment of FIG. 1, the portal 120, the encoder 130, the gateway 140, the processor 150, the report module 152, can separately or in any combination of the aforementioned be a computing platform. A computing platform performs various functions and operations in accordance with the invention. The computing platform can be, for instance, a personal computer (PC), server or mainframe computer. The computing platform can be a general purpose computer reconfigured by a computer program, or may be specially constructed to implement the features and operations of the system 100 and/or the method 600. The computing platform may also be provided with one or more of a wide variety of components or subsystems including, for example, a processor, co-processor, register, data processing devices and subsystems, wired or wireless communication links, input devices, monitors, memory or storage devices such as a database.

The system 100 can be a network configuration or a variety of data communication network environments using software, hardware or a combination of hardware and software to provide the processing functions. All or parts of the system 100 and processes can be stored on or read from computer-readable media. The system 100 can include computer-readable medium having stored thereon machine executable instructions for performing the processes described. Computer readable media may include, for instance, secondary storage devices, such as hard disks, floppy disks, memory sticks, and CD-ROM; a carrier wave received from the Internet; or other forms of computer-readable memory such as read-only memory (ROM) or random-access memory (RAM).

The processes of the invention can be implemented in a variety of ways and include other modules, programs, applications, scripts, processes, threads or code sections that interrelate with each other. The program modules can be commercially available software tools using custom object-oriented code written in C++ programming language, using applets written in Java programming language, or be implemented with discrete electrical components or as one or more customized hardwired application specific integrated circuits (ASIC).

As shown in FIG. 1, the portal 120 solicits and accepts donations or other payments, and when an individual 110 wishes to donate or make a payment, the portal 120 directs the transaction of the individual 110 to the encoder 130. The portal 120 may be a website operated by a server. In the preferred embodiment, the portal 120 is a computer terminal, such as a PC, which has Internet access and can browse websites. The individual 110 uses the terminal 120 to access a website that solicits credit card transactions and to initiate a financial transaction, such as a contribution to a political campaign or charitable cause or a purchase. The individual 110 selects the appropriate command on the website to begin the transaction. For example, the website can have a clickable selection for submitting a credit card donation or payment. The individual 110 enters electronic transaction data 250 at the portal 120. The portal 120 then communicates with the encoder 130 by secure connection, such as a secure sockets layer (SSL).

Figure 2:
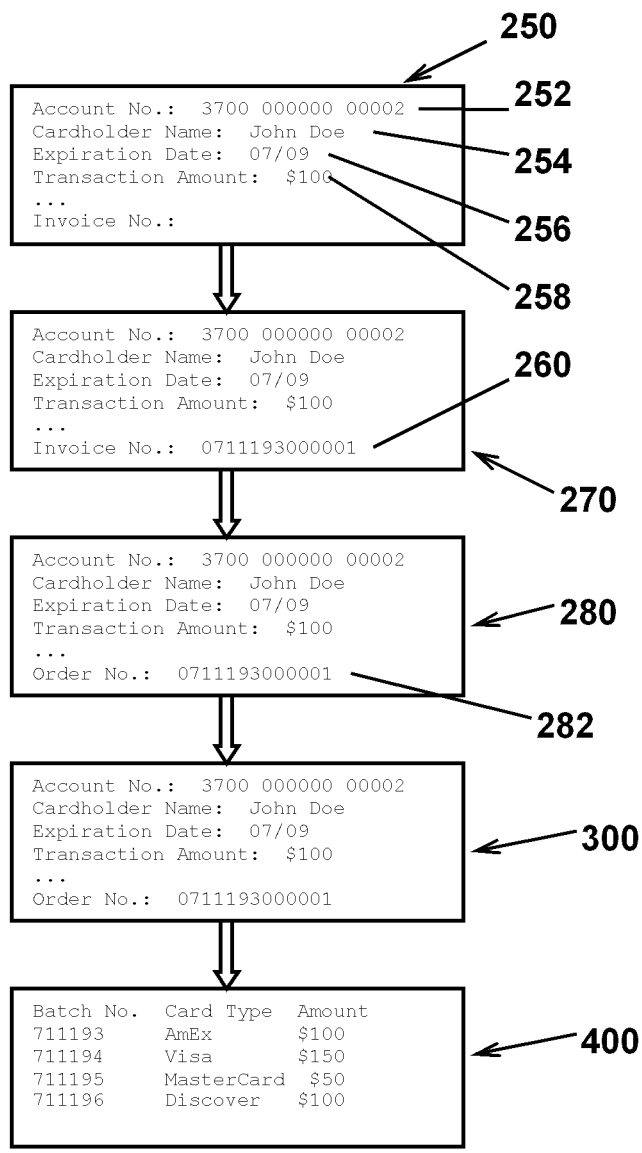
FIG. 2 is a flow diagram showing how electronic transactions are encoded by the system illustrated in FIG. 1.

The encoder 130 prompts for, accepts, and encodes the electronic transaction data 250 from the portal 120 that was entered by the individual 110. In the preferred embodiment, the encoder 130 is a server that is remote from and in secure communication with the portal 120. The server that acts as the encoder 130 can be separate from the server that operates as the portal 120 or be the same as the server that operates as the portal 120. The encoder 130 preferably has programming and/or an application program interface (API) to request and receive the electronic transaction data. The encoder 130 prompts the individual 110 for data to process the transaction and inserts the data into predetermined data fields. The encoder 130 has Advanced Integration Method (AIM) API which includes a predetermined list of data fields. AIM API is described in the "Advanced Integration Method (AIM) Implementation Guide Card-Not-Present Transactions" issued by Authorize.Net Holdings, Inc. As shown in FIG. 2, the electronic transaction data 250 preferably has data fields that include, at least, the transaction amount 258, the account or credit card number 252, the account or credit card holder's name 254, and the credit card expiration date 256, if relevant. The data 250 can also include other data fields, denoted by " . . . " in FIG. 2. Other data fields include, for example, the individual's name, address, company or employer, phone number, fax number, identification number, IP address, tax identification or social security number, and/or email address.

The data 250 is encoded by inserting a code 260 in an optional data field of the electronic data transaction. The data 250 includes an optional data field for "invoice number," "description," and/or other similar data field, in which the system 100 can assign a unique code 260, as shown in FIG. 2. An optional data field is used so as not to interfere with the processing of the transaction. In one exemplary embodiment, the encoder 130 uses the "invoice number" field provided by AIM API to encode the electronic transaction. The code 260 in the optional data field, such as the "invoice number," is unique to each transaction so that the transaction can be tracked and/or identified. The data 250 with the code 260 appended is shown in FIG. 2 as the encoded electronic transaction data 270. Additional programming, API, or other similar methods are used to create the code 260 and then insert the code 260 into an optional data field, such as the "invoice number" data field. The code 260 provides, at least, the date of the transaction, the credit card type, and sequence information. In the preferred embodiment, the code has the following information in the following order: year, month, day, credit card identifier, and sequence number. The first two digits represent the year. Next, the month is represented by another two digits corresponding to the numerical order of the month in the year. Following the month are two digits representing the day of the month. Then, the next two digits are used to identify the credit card type. Preferably, the digits "30" represent an AMERICAN EXPRESS® credit card, the digits "40" represent a VISA® credit card, the digits "50" represent a MASTERCARD® credit card, and the digits "60" represent a DISCOVER® credit card. After the two digits identifying the credit card type, the remaining digits indicate the order in which the transaction was completed, i.e., whether it is the first, second, third, or nth transaction, for that day. The number is sequentially assigned by the system 100. Thus, the code 260 shown in the example of FIG. 2 is "0711193000001," where "07" indicates the year 2007, "11" indicates the month November, "19" indicates the 19$^{th}$ day of the month, "30" indicates an AMERICAN EXPRESS® credit card, and "00001" indicates it was the first transaction on that day. Therefore, the code "0711193000001" represents the first transaction with an AMERICAN EXPRESS® credit card on Nov. 19, 2007.

Returning to FIG. 1, the gateway 140 receives the encoded electronic transaction data 270 from the encoder 130. The gateway 140 allows the system 100 to accept credit card transactions without the individual 110 having to present his credit card physically and having the card swiped through a credit card reader. The gateway 140 prompts for and accepts electronic transaction data 250 from the encoder 130. By having the electronic transaction data 250 pass through the encoder 130, instead of directly to the gateway 140, the electronic transaction data 250 is encoded with a code 260 in an optional data field. The gateway 140 requests from the encoder 130 information required for a credit card transaction to be processed by the processor 150. The gateway 140 then translates, reformats, and otherwise manipulates the information required to complete the transaction so that it will be recognized and accepted by the processor 150. The gateway 140 also accepts the code 260 because all transaction data, along with any data in optional data fields, are translated, reformatted, or otherwise manipulated along with the required data fields. The gateway 140 also receives authorization data from the processor 150 and sends the authorization data to the encoder 130. The operations performed by the gateway 140 can be a commercially available service such as AUTHORIZE.NET®. AUTHORIZE.NET® is described in "E-Commerce Getting Started Guide" by CyberSource Corporation. Online software to implement the gateway 140 is also available from SignaPay, LTD.

The processor 150 receives the properly formatted and encoded electronic transaction data 270 from the gateway 140 and processes it for authorization and payment. The processor 150 reformats or translates the data 270 received from the gateway 140 to form transaction data 280 formatted specifically for a particular network 160 or issuer 170. The processor 150, the network 160, and the issuer 170 can have different format requirements for the data 250, because each is operated by a different entity with its own requirements for data formatting. Furthermore, for each type of credit card, there is a particular credit card issuer 170, and each credit card issuer 170 requires electronic credit card transaction data in a particular format. The processor 150 also stores the approved and encoded electronic transaction data 270 in its memory, database, or other similar data storage device. The operations performed by the processor 150 can be a commercially available service such as Paymentech. Paymentech is described in "Chase Paymentech" by Chase Paymentech Solutions, LLC and available at www.chasepaymentech.com. Software packages to implement the processor 150 are available from SignaPay, LTD.

The processor 150 formats and translates the code 260 which was placed in the optional data field by the encoder 130 along with the information required to complete the transaction. In the preferred embodiment, the code 260 that was inserted in the "invoice number" field is transferred into the "order number" field 308, as shown in FIG. 2. An optional data field is used so as not to interfere with the processing of the transaction. The processor 150 submits the encoded electronic transaction data 270 formatted for a specific credit card issuer 170 to the network 160.

If the submitted encoded electronic transaction is authorized by the credit card issuer 170, the processor 150 relays the encoded electronic transaction data 270 and approval to the gateway 140 which sends the encoded electronic transaction data 270 with an approval code to the encoder 130, and the encoder 130 relays the approval code to the portal 120. The portal 120 then indicates to the individual 110 that the transaction has been approved. The approved transaction is stored in the gateway 140, as described by CyberSource.

Based on the credit card type, the network 160 transmits the specifically formatted and encoded electronic transaction data 270 to the proper credit card issuer 170 for authorization. The network 160 passes electronic transaction data by providing a communication pathway between, at least, the processor 150, the credit card issuer 170, and the beneficiary's bank 180.

The credit card issuer 170 provides the individual 110 with a credit card account and authorizes a submitted electronic transaction if the credit card information is valid and if there is sufficient balance available to cover the transaction amount. If authorized, the credit card issuer 170 will send through the network 160 to the processor 150 an indication that the encoded electronic transaction has been authorized. The credit card issuer 170 sends the encoded electronic transaction data 270 with authorization back to the processor 150 through the network 160. Later, the credit card issuer 170 transfers funds to the beneficiary's bank 180 to credit the account of the beneficiary 190. The beneficiary's bank 180 accepts funds from the credit card issuer 170 through the network 160. As described above, the transfer of funds from the credit card issuer 170 to the beneficiary's bank 180 may take several days after approval of the transaction, and a transaction fee may be deducted by the credit card issuer 170 under a net billing agreement.

The report module 152 provides a report 400. The report 400 is based on interpreting the authorized transactions stored in the memory, database, or other similar storage device of the gateway 140 and/or the processor 150. In the preferred embodiment, the processor 150 generates and provides data 300 to the report module 152, and the report module 152 interprets the data 300 to form the report 400. The data 300 includes, at least, the electronic transaction data 250 preferably has data fields that include, at least, the transaction amount 258, the account or credit card number 252, the account or credit card holder's name 254, and the credit card expiration date 256, if relevant. Referring to FIG. 3, example data 300 from the processor 150 is shown. The data 300 contains information about transactions 310a-324c. The first column entitled "Merchant Name" provides the name 302 of the entity set up to receive funds electronically, i.e., the beneficiary 190. The second column entitled "TR Date/Time" notes the time and date 304 that the authorized transactions 310a-324c occurred. The third column entitled "Reporting Merch #" gives the merchant number 306 or a number assigned to an entity with an account that receives funds electronically. A merchant number 306 is required for internet transactions, as described by Authorized.Net Holdings. Inc. The fourth column, "Order #," provides the order number 308 which, for the preferred embodiment, corresponds to the code 260. As discussed above, the code 260 is inserted into an optional data field. In the example shown in FIG. 3, the order number 308 is the code 260 without the digits indicating the sequence.

The fifth column, "Batch #" gives the batch identification number 326 associated with the batch of authorized transactions 310a-324c submitted for settlement to the processing network 160. The batch identification number 326 is sequentially assigned with each batch of authorized transactions 310a-324 submitted for settlement for each day. Thus, batch identification number 326 "007-1" indicates it is the first batch submitted for day "007." The column entitled "Batch Close" provides the date and time 328 that the batch was submitted to the processing network 160. The column entitled "Seq #" lists the sequence 330 in which the transactions 310a-324c were received and authorized. The sequence 330 is based on the digits of the code 260 representing the order in which the transactions 310a-324c were completed. Although transactions 310a-314 are listed sequentially, the transactions do not have to be listed in the order the transactions 316a-24c were received.

The column entitled "Card Type" provides the type 332 of credit card used for each transaction 310a-324c. The ninth column, entitled "Auth Code," lists the authorization codes 334 associated with each of the transactions 310a-324c. The column entitled "Term/Op ID" lists identifications 336 that identify one terminal for accepting credit card data for processing from several other terminals that accept credit card data for processing. In the example data 300, there is only one terminal for accepting credit card data for processing, the gateway 140, thus there is only one identification 336 listed, i.e. "1." The processor 150 assigns the identification 336. The next column entitled "TR Type" gives the transaction type 338. The transaction type 338 can be a "Sale," a "Recurring" transaction, or a "Return." A "Sale" indicates funds will be transferred into the beneficiary's account, while a "Return" indicates funds will be taken out from the beneficiary's account. A "Recurring" transaction is a transaction initiated by the same individual 110 to be processed automatically at a prearranged time each week, month, quarter, or some other predetermined time period. The penultimate column ("AMT") lists the transaction amount 340 (or the submitted amount 258 of the electronic transaction data 250) for each transaction 310a-324c. The last column entitled "Curr" gives the currency type 342 of the transaction amount 340. The data 300 is preferably provided in a comma separated values (*.csv) file.

Referring to FIG. 4, an exemplary report 400 from the system 100 is shown. The report 400 is preferably based on the data 300 from the processor 150. In the exemplary report 400, the first column entitled "Batch Number" lists batch numbers 402. In the embodiment depicted, the batch numbers are based on the code 260, except that the batch numbers 402 do not include the leading zero, the second digit of the two digits representing the credit card type, and the sequence number, thus "0711193000001" becomes "711193". The batch numbers 402 also correspond to the order numbers 308 of the data 300 because both 308 and 402 are based on the code 260. The second column entitled "Card Type" lists the card type 404, and the card type 404 of the report 400 corresponds to the card type 332 of the data 300. The third column entitled "Close Date" lists the closing date 406 of the batch. The closing dates 404 of the report 400 correspond to the date and time 328 that the batch was submitted as indicated in the data 300. The closing date 406 of the batch is the date that the approved transactions are sent to the credit card issuer 170 for payment and transfer of funds to the beneficiary's bank 180. As described above, each batch of authorized transactions is typically closed out at the end of the day.

The fourth column entitled "Sale Count" provides the number of "Sale" transactions 426 that occurred. The number of "Sale" transactions 426 are derived from the transaction type 338 listed in the data 300. The next column, entitled "Sale Amount," lists the total amount of "Sale" transactions 428 for a particular credit card type 404. The sixth column entitled "Recurr" provides the number of recurring transactions 436 from the same individual 110 and is based on transaction type 338 listed in the data 300. The next column, "Recurring Amount," lists the total amount 438 of recurring transactions 436. The eighth column entitled "Return Count" gives the number of "Return" transactions 430 that occurred or the number of transactions where the individual 110 was reimbursed by the beneficiary 190. Similar to the number of "Sale" transactions 426 and recurring transactions 436, the number of "Return" transactions 430 is derived from the transaction type 338 of data 300. The next column, "Return Amount," provides the total amount of "Return" transactions 432. The column entitled "Trans Count" indicates the total number 434 of "Sale," "Recurr," and "Return" transactions 426, 436, and 430.

The last column entitled "Batch Amount" lists the total authorized transaction amounts 408 for the card type 404 listed in the second column for that day. The total authorized transaction amount 408 is based on the transaction amount 340 of the data 300. The total authorized transaction amount 408 for each card type 404 is reported as if under a gross billing agreement, i.e., the credit card transaction amount without any transaction fees deducted. The report 400 includes eight batches 410-424. Batches 410, 416, and 422 are AMERICAN EXPRESS® transactions that closed on each day, namely "Nov. 20, 2007," "Nov. 21, 2007," and "Nov. 23, 2007," respectively. Comparing data 300 with report 400, transactions 310a-310c of the data 300 are summed and listed collectively as batch 410 in the report 400. The data 300 indicates transactions 310a-310c involved amounts 340 of $15.00, $75.00, and $10.00, respectively, and report 400 states the total amount of $15.00+$75.00+$10.00 or $100.00 as the total authorized transaction amount 408 for batch 410. Similarly, AMERICAN EXPRESS® transactions 316a-316c and 322a-322b are summed and listed collectively as batches 416 and 422, respectively. Batches 412, 418, and 420 are VISA® and MASTERCARD® transactions that closed on "Nov. 20, 2007," "Nov. 21, 2007," and "Nov. 22, 2007," respectively. VISA® and MASTERCARD® transactions are combined because VISA® and MASTERCARD® use the same credit card issuer 170 and that same credit card issuer 170 transfers funds to the beneficiary's bank 180. As described above, both VISA®, and MASTERCARD® use the same bank card system instead of an outside credit card system like AMERICAN EXPRESS® and DISCOVER®, thus VISA® and MASTERCARD® transactions are reported together.

Thus, for example, transactions 312a-312c are transactions with a VISA®, a MASTERCARD®, and another VISA® card, respectively, as indicated by credit card type 332. The data 300 indicates transactions 312a-312c are for amounts 340 of $50.00, $50.00, and $50.00, respectively, and the report 400 gives the total amount 408 as $150.00 for batch 412. Batches 414 and 424 are DISCOVER® transactions that closed on "Nov. 20, 2007" and "Nov. 23, 2007," respectively. Similar to the AMERICAN EXPRESS®, VISA®, and MASTERCARD® transactions, the total amounts 408 for batches 414 and 424 are based on the transactions amounts 340 of authorized transactions 314 and 324a-324c.

Referring to FIG. 5, a portion of a bank statement 500 is shown. The bank statement 500 is for the beneficiary's account. Several deposits 512-524 are listed among other deposits, checks, purchases, and other similar items. The deposits 512-524 are deposits made by credit card issuers 170 to settle authorized credit card transactions 310a-324c.

With the report 400, the beneficiary 190 correlates the amounts submitted by individuals 110 with the amount actually credited to the beneficiary's bank account, as reflected by the statement 500. Thus, for example, the exemplary report 400 shown in FIG. 4 can be correlated to the exemplary bank statement 500 shown in FIG. 5. The AMERICAN EXPRESS® transactions reported in batches 410, 416, and 422 correspond to deposits 510, 516, and 522, respectively. Although the transactions were closed on "Nov. 20, 2007," "Nov. 21, 2007," and "Nov. 23, 2007," the AMERICAN EXPRESS® credit card issuer 170 did not transfer funds to the beneficiary 190 until "Nov. 25, 2007," "Nov. 27, 2007," and "Nov. 29, 2007," respectively. Similarly, VISA® and MASTERCARD® transactions reported in batches 412, 418, and 420 correspond to deposits 512, 518, and 520. And, DISCOVER® transactions reported in batches 414 and 424 correspond to deposits 514 and 524.

Also, in the example report 400 and bank statement 500, for the AMERICAN EXPRESS®, VISA®, and MASTERCARD® transactions, the batch amounts 408 equal the deposited amounts, because the credit card transactions are settled under a gross billing agreement and no transaction fees are deducted before crediting the beneficiary's account. Instead, the beneficiary 190 pays the transaction fees later. However, in the example shown in FIGS. 4 and 5, for the DISCOVER® transactions, the batch amounts 408 are more than the deposited amounts because the credit card transactions are net billing transactions where transactions fees are deducted before crediting the beneficiary's account. Thus, in FIGS. 4 and 5, a transaction fee of 1.5% is deducted from the DISCOVER® transactions, so that the $100 submitted by the individual 110 in batch 414 correlates to the $98.50 listed as deposit 514. Without the report 400, correlating the amount submitted by the individual 110 and the amount actually received by the beneficiary 190 would be complicated by the difference in the two amounts. The report 400 gives the beneficiary 190 the amount that was actually submitted by the individual 110, and the beneficiary 190 does not have to calculate the submitted amount by taking into account the transaction fee. With the report 400, the beneficiary 190 has the actual submitted amount and does not have to perform an additional calculation, thus expediting and simplifying the tracking, identifying, and correlating of transactions. Also, the beneficiary 190 can verify that the difference in the amounts is due to the deduction of transaction fees. Subsequently, the beneficiary 190 can report to the appropriate federal and/or state authorities the correct amount, i.e., the $100, paid by the individual 110 with the correct offsetting disbursements equaling the net amount deposited.

Figure 6:
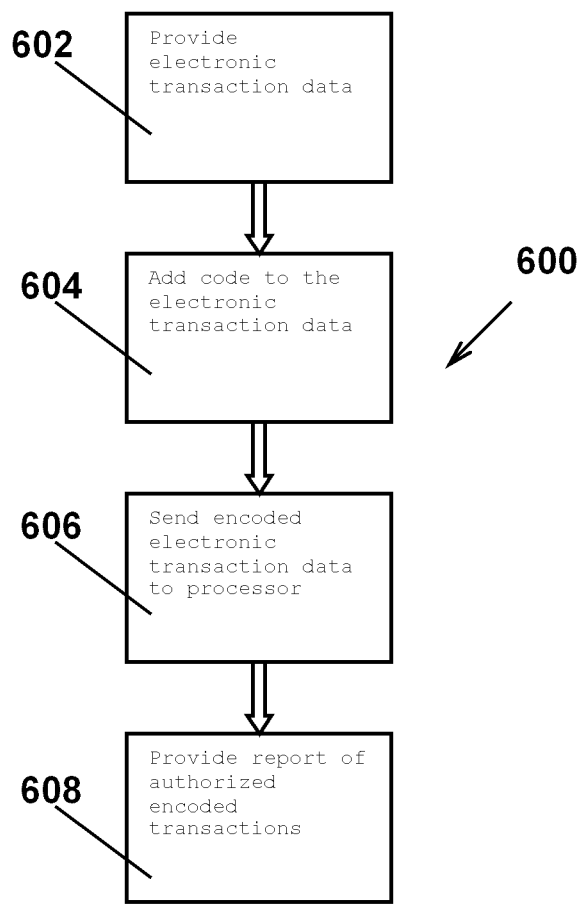
FIG. 6 is a flow diagram of a method of tracking, identifying, and encoding electronic transactions in accordance with an exemplary embodiment of the invention.

Referring to FIG. 6, a method 600 of tracking and encoding electronic transactions is shown. The method 600 begins with providing electronic transaction data, step 602. As shown in FIG. 2, the electronic transaction data 250 includes the credit card or account number 252, the cardholder or account holder name 254, the credit card expiration date 256, if applicable, and the transaction amount 258 (i.e. the submitted amount), as well as other data fields, denoted by " . . . " In the exemplary embodiment, an optional data field is also present, in which a code 260 is to be inserted. The electronic transaction data 250 is entered by the individual 110 at the portal 120. For example, the individual 110 can donate money to a political campaign after accessing the campaign's website. Because the portal 120 is in communication with the encoder 130, the encoder 130 accepts the electronic transaction data 250 for encoding.

Next, at step 604, the encoder 130 generates a code 260 and appends that code 260 to the electronic transaction data 250. The code 260 is not essential to completing the transaction electronically, but the code 260 allows for tracking and referring to the data 250. The code 260 is inserted into the optional data field. As discussed above, the code 260 includes, at least, the date of the transaction, the type of transaction, and a transaction number denoting the chronological order of a transaction of a particular type on that particular date. The electronic transaction data 250 with the code 260 forms an encoded electronic transaction data 270 that is then sent to the processor 150, step 606. Also, a report 400 based on authorized encoded transactions is generated, step 608. Authorized encoded transactions are collected and stored as the data 300, and by aggregating the authorized encoded transactions, the report 400 details the total authorized amount for a particular card type 332 and 404 for a particular date. Exemplary data 300 and report 400 are shown in FIGS. 2-4.

To further illustrate the invention, the following exemplary embodiment is provided. However, the invention is not intended to be limited by the exemplary embodiment. The individual 110 accesses the website of a political organization that is the beneficiary 190 and wishes to submit a donation by credit card to the organization. The website is the portal 120 in this exemplary embodiment. After the individual 110 indicates that he wants to initiate a financial transaction, the website 120 communicates with the encoder 130 which is a remote server. The website 120 prompts the individual 110 for credit card information, which is received in the encoder 130 as the electronic transaction data 250. After the individual 110 submits his credit card information, step 602, the encoder 130 adds a code 260 to an optional data field of the electronic transaction data 250, step 604, and then submits the encoded electronic transaction data 270 to the gateway 140, step 606. The gateway 140 formats the encoded electronic transaction data 270 so that it will be accepted by the credit card issuer 170. Then, the gateway 140 sends the formatted and encoded electronic transaction data 270 to the credit card issuer 170 for authorization via the credit card processing network 160. The credit card issuer 170 verifies that the credit card information is properly formatted and that the encoded electronic transaction data 270 is valid and ensures there is sufficient balance available. Once authorized, the credit card issuer 170 sends its authorization along with the formatted and encoded electronic transaction data to the processor 150 through the credit card processing network 160. The processor 150 relays the authorization and the formatted and encoded electronic transaction data 270 to the gateway 140, and the gateway 140 sends the encoded electronic transaction data 270 with an approval code to the encoder 130. The encoder 130 relays the approval or authorization code to the website. The website indicates to the individual 110 that the credit card transaction has been authorized.

The gateway 140 stores the authorized transaction data along with other authorized transactions from that day, as described by CyberSource. At the end of each day, the gateway 140 transmits directly to or through the processor 150 all of the authorized transaction data to the credit card processing network 160. The credit card issuer 170 then transfers funds to the organization's bank account 180 in accordance with the authorized transaction data. As described above, the transfer may take 1-7 days depending on the type of credit card.

The processor 150 sends data 300, and the report module 152 provides a report 400 based on interpreting the data 300 listing authorized encoded transactions, step 608. The report 400 is used to correlate the amount donated by the individual 110 with the appropriate associated amount deposited into the organization's bank account.

While a particular embodiment has been chosen to illustrate the invention, it will be understood by those skilled in the art that various changes and modifications can be made therein without departing from the scope of the invention as defined in the appended claims.

Though described as being especially useful for credit cards, the system 100 and method 600 can be used with other financial and non-financial transactions, such as electronic check transactions, debit transactions, telephone transactions where the transaction data is entered manually into the system 100, transactions by mail where the transaction data is mailed and then entered into the system 100, transactions by telephone where the transaction data is entered via a phone line or entered manually into the system 100, credit card transactions where credit card readers are in communication with the system 100. Accordingly, the portal 120 can be an electronic check portal, a debit portal, a mail order portal, a telephone order portal, a credit card reader, or other similar device that accepts information that can be transmuted into electronic transaction data. The portal 120 can also be a stand-alone personal computer, a personal digital assistant, or some other device that interfaces with the Internet or a network.

Also, the encoder 130 can use other optional data fields in the AIM API that do not interfere with the processing of the transaction, such as, the "source code" data field, the "employer" data field, the "occupation" data field, or other similar data field that is optional and not required to complete the transaction.

Furthermore, in alternate embodiments, the network 160 can be a local area network (LAN) or wide area network (WAN). The system 100 can include hard-wired connections, wireless connections, or both. Wireless connections can include, for example, radiofrequency (RF), 802.11 (WiFi), Bluetooth, or any combination of the aforementioned. And, the credit card issuer 170 can be a bank that services a checking account of the individual 110 for electronic check transactions or debit transactions.

What is claimed is:

1. A system of tracking, identifying, and encoding an electronic transaction, the electronic transactions presentable in a financial report, comprising:
    a portal soliciting electronic transactions, the portal forming electronic transaction data for each of the electronic transactions, the electronic transaction data using a predetermined data format, the electronic transaction data including at least
        a submitted amount,
        a transaction type, and
        a date of transaction;
    an encoder in communication with the portal and being remote from the portal, the encoder accepting the electronic transaction data from the portal, forming a code for each of the electronic transactions based on the transaction type and the date of transaction of each of the electronic transaction data, and appending the code into the respective electronic transaction data to provide encoded electronic transaction data by using predetermined data fields of the electronic transaction data without changing the predetermined data format;

a processor in communication with the encoder and a processing network which authorizes the encoded electronic transaction data to provide authorized encoded electronic transaction data, the processor providing to the processing network the encoded electronic transaction data received from the encoder during a predetermined period of time and receiving from the processing network the authorized encoded electronic transaction data based on the provided encoded electronic transaction data received during the predetermined period of time; and a report module in communication with the processor and receiving from the processor the authorized encoded electronic transaction data for the predetermined period of time, the report module forming a report based on the authorized encoded electronic transaction data, the report allowing a user to reconcile the report with the financial report of the electronic transactions, the report including
 a portion of the code, and
 a total submitted amount for each transaction type so as to compare the total submitted amount with a total received amount to identify a difference between the total submitted amount and the total received amount.

2. The system according to claim 1, wherein the electronic transaction data comprises credit card transaction data.

3. The system according to claim 2, wherein the report includes the total authorized encoded electronic transactions on a particular day for a particular credit card type.

4. The system according to claim 1, wherein the electronic transactions comprises donations.

5. The system according to claim 4, wherein the donation comprises political donations.

6. The system according to claim 1, further comprising a gateway in communication with the encoder, the gateway receiving the encoded electronic transaction data and submitting the encoded electronic transaction data for processing.

7. A system of tracking, identifying, and encoding electronic transactions, the electronic transactions presentable in a financial report, comprising:

a computer configured for obtaining electronic transaction data for a plurality of electronic transactions from a portal, the electronic transaction data using a predetermined data format, the electronic transaction data including a transaction type and a date of transaction for each of the plurality of electronic transactions, for forming a code based on the transaction type and the date of transaction of the electronic transaction data, and for appending the code into each of the plurality of electronic transactions of the electronic transaction data to form encoded electronic transaction data by using predetermined data fields of the electronic transaction data without changing the predetermined data format; and a report module in communication with the computer, the report module forming a report based on the authorized electronic transaction data, the report allowing a user to reconcile the report with the financial report of the electronic transactions, the report including;
 a transaction date and time,
 at least a portion of the code that identifies one of the plurality of transaction types,
 a batch identification number associated with a plurality of authorized transactions submitted for settlement,
 a batch submission date and time, and
 total authorized electronic transactions on a particular day for each one of the plurality of transaction types.

8. The system according to claim 1, wherein the report further includes a date of providing the encoded electronic transaction data to the processing network transaction.

9. The system according to claim 1, wherein a data amount of the predetermined data fields of the predetermined data format is not changed by the appending of the code.

10. A computer-readable storage device having stored thereon machine executable instructions for reconfiguring a computing platform to perform the steps of:

receiving from a second computing platform electronic transaction data including a plurality of electronic transactions, the electronic transactions presentable in a financial report, each of the plurality of electronic transactions using a predetermined data format, each of the electronic transactions including at least a transaction amount, a transaction type, and a date of transaction, the second computing platform being remote from the computing platform;

forming a code for each of the plurality of electronic transactions based on the transaction type and the date of transaction;

appending the code into each of the plurality of electronic transactions, the plurality of electronic transactions with appended codes forming an encoded electronic transaction data by using predetermined data fields of the electronic transactions without changing the predetermined data format;

transmitting the encoded electronic transaction data to a third computing platform for processing;

receiving from the third computing platform completed encoded electronic transactions;

storing data based on the completed encoded electronic transactions;

retrieving the stored data;

interpreting the stored data; and forming a report based on the stored data, the report allowing a user to reconcile the report with the financial report of the electronic transactions, the report including
 a portion of the appended code, and
 a total transaction amount for each transaction type so as to compare the total transaction amount with a total received amount from each transaction type to identify a difference between the total submitted amount and the total received amount.

11. The device according to claim 10, wherein the electronic transaction data comprises credit card transaction data.

12. The device according to claim 10, wherein the machine executable instructions reconfigures the computing platform to further perform the step of submitting the encoded electronic transaction data to a credit card processing network.

13. The device according to claim 10, wherein the machine executable instructions reconfigures the computing platform to further perform the step of inserting the code into a particular field of the electronic transaction data.

14. The device according to claim 10, wherein the report further includes a date of providing the encoded electronic transaction data to the third computing platform.

15. The device according to claim 10, wherein a data amount of the predetermined data fields of the predetermined data format is not changed by the appending of the code.

16. An apparatus for tracking, identifying, and encoding an electronic transaction received from a portal, the electronic transactions presentable in a financial report, comprising:

means for obtaining electronic transaction data for a plurality of electronic transactions from the portal, the electronic transaction data using a predetermined data format, the electronic transaction data including a transaction type and a date of transaction for each of the plurality of electronic transactions;

means for forming a code based on the transaction type and the date of transaction of the electronic transaction data;

means for appending the code into each of the plurality of electronic transactions of the electronic transaction data to form encoded electronic transaction data by using predetermined data fields of the electronic transaction data without changing the predetermined data format;

means for submitting the encoded electronic transaction data for processing;

means for storing data based on authorized encoded electronic transactions;

means for interpreting the stored data; and means for forming a report based on the stored data, the report allowing a user to reconcile the report with the financial report of the electronic transactions, the report including a portion of the code, and a total amount for each transaction type so as to compare the total amount with a total received amount to identify a difference between the total submitted amount and the total received amount.

17. The apparatus according to claim 16, wherein the electronic transaction data comprises at least one of credit card transaction data, electronic check transaction data, and debit transaction data.

18. The apparatus according to claim 16, further comprising means for manipulating the encoded electronic transaction data so that it is formatted for processing.

19. The apparatus according to claim 16, wherein the encoded electronic transaction data is submitted to a credit card processing network.

20. The system according to claim 7, wherein the code is in a particular data field of the authorized electronic transaction data.

21. The apparatus according to claim 16, wherein the report further includes a date of submitting the encoded electronic transaction data for processing.

22. The apparatus according to claim 16, wherein a data amount of the predetermined data fields of the predetermined data format is not changed by the appending of the code.

\* \* \* \* \*